(12) United States Patent
Draycott et al.

(10) Patent No.: US 8,280,033 B2
(45) Date of Patent: Oct. 2, 2012

(54) PROVISION OF ALTERNATIVE TELECOMMUNICATION SERVICES

(75) Inventors: Andrew Draycott, Leicestershire (GB); Martin Goetzer, Backnang (DE)

(73) Assignee: Ericsson AB, Stockholm (SE)

(*) Notice: Subject to any disclaimer, the term of this patent is extended or adjusted under 35 U.S.C. 154(b) by 1322 days.

(21) Appl. No.: 11/721,521

(22) PCT Filed: Dec. 5, 2005

(86) PCT No.: PCT/EP2005/056468
§ 371 (c)(1),
(2), (4) Date: Dec. 18, 2007

(87) PCT Pub. No.: WO2006/063951
PCT Pub. Date: Jun. 22, 2006

(65) Prior Publication Data
US 2009/0290703 A1    Nov. 26, 2009

(30) Foreign Application Priority Data
Dec. 14, 2004   (GB) .................................. 0427223.3

(51) Int. Cl.
*H04M 5/00* (2006.01)

(52) U.S. Cl. ........ 379/325; 379/326; 379/327; 379/328; 379/329; 379/330; 379/242; 379/248; 379/397

(58) Field of Classification Search .................. 379/217, 379/244, 399.01, 326
See application file for complete search history.

(56) References Cited

U.S. PATENT DOCUMENTS

| 3,571,530 | A | * | 3/1971 | Davies ............................. 379/30 |
| 4,583,215 | A | * | 4/1986 | Hargrave et al. ............... 370/217 |
| 5,455,856 | A |   | 10/1995 | Story |
| 5,764,754 | A |   | 6/1998 | Ortel et al. |
| 6,349,093 | B1 |   | 2/2002 | Caldwell et al. |
| 7,136,481 | B2 | * | 11/2006 | Freeman et al. ............... 379/326 |
| 7,200,206 | B1 | * | 4/2007 | Carbain ..................... 379/27.01 |
| 2003/0103614 | A1 | * | 6/2003 | Smith .......................... 379/244 |
| 2004/0005049 | A1 | * | 1/2004 | Bain et al. ................. 379/387.01 |
| 2004/0120508 | A1 | * | 6/2004 | Sajadi et al. ............. 379/399.01 |
| 2004/0258213 | A1 | * | 12/2004 | Beamon et al. .................... 379/9 |
| 2005/0111628 | A1 | * | 5/2005 | Beamon ..................... 379/27.01 |

FOREIGN PATENT DOCUMENTS

| EP | 1175078 | 1/2002 |
| EP | 1 229 745 | 8/2002 |
| EP | 1229706 | 8/2002 |
| WO | 01/20922 | 3/2001 |
| WO | 01/45452 | 6/2001 |

* cited by examiner

*Primary Examiner* — Joseph J Nguyen
(74) *Attorney, Agent, or Firm* — Coats & Bennett, P.L.L.C.

(57) ABSTRACT

Apparatus for providing a plurality of alternative telecommunications services to a plurality of users (14, 16, 18, 20, 22) of a telecommunications network (10) comprising a primary cross-connect (26) in communication with a node (12) of the network for supplying a first selected telecommunications service to the users (14, 16, 18, 20, 22), and a secondary cross-connect (28) in communication with the node (12) and the primary cross-connect (26). The primary cross-connect (26) is provided with switches (34). The switches (34) are operable from a remote location (36) to disconnect a selected user (14, 16, 18, 20, 22) from the telecommunications services, and the secondary cross-connect (28) is are operable from a remote location (36) to reconnect the selected user (14, 16, 18, 20, 22) to an alternative telecommunication service through the secondary cross-connect (28).

13 Claims, 1 Drawing Sheet

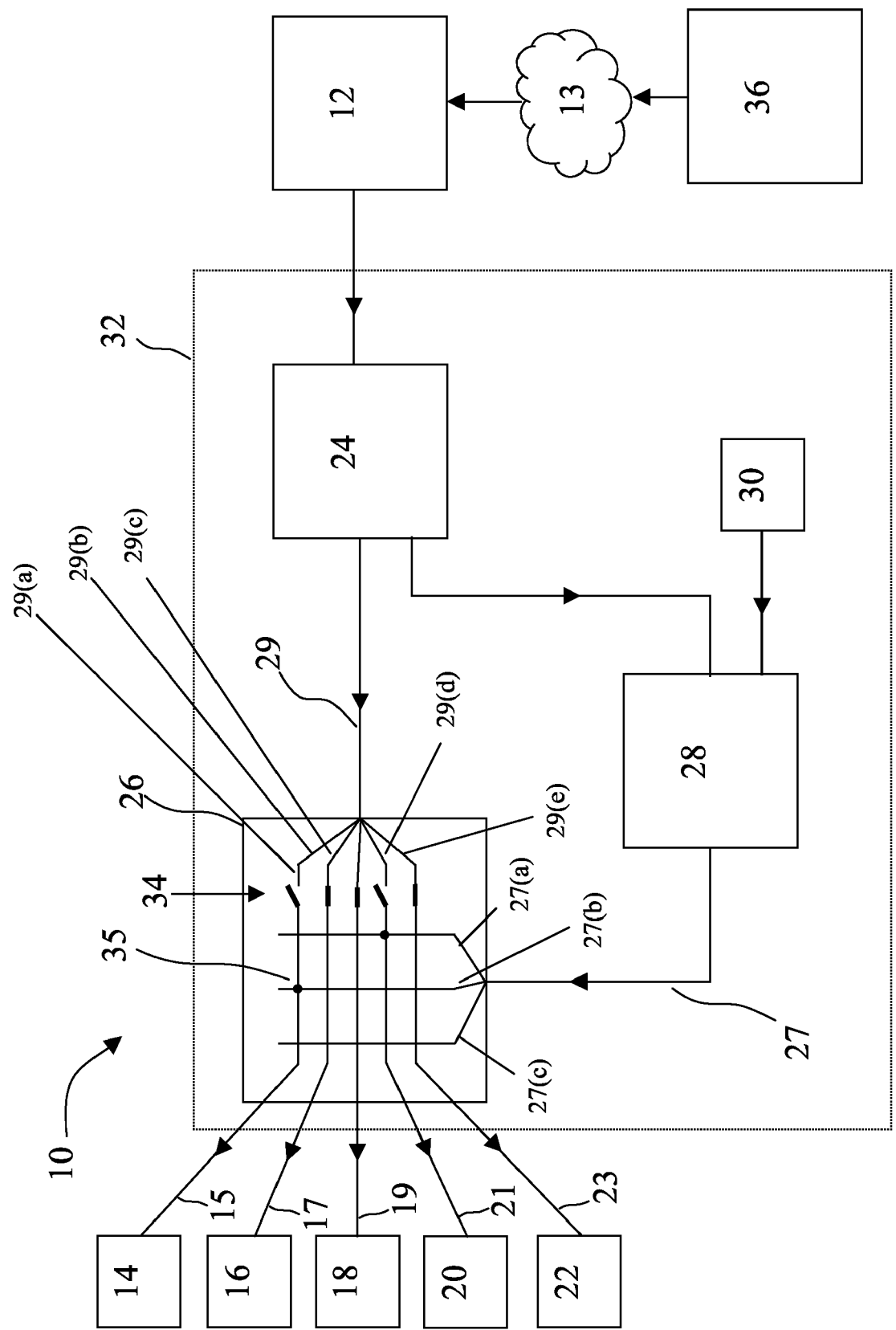

PROVISION OF ALTERNATIVE TELECOMMUNICATION SERVICES

The present invention relates to an apparatus and a method for providing telecommunications services to users.

Current telecommunications networks can supply a variety of telecommunications services to customers via a Multi-Service Access Node (MSAN). Such a MSAN can provide services such as Plain Old Telephone Services (POTS), Digital Subscriber Lines (DSL), or Integrated Services Digital Network (ISDN) lines. These services are supplied via customer subscriber lines which are typically copper cables connected to a customer Main Distribution Frame (MDF), The customer MDF is usually located in a service box at a location near to the customer's premises. The MSAN is connected to a provider-MDF that is also located in the service box. To supply a particular telecommunications service to a customer the service provider must make connections between the customer MDF and the provider-MDF. A service engineer, who must visit the service box and make the connections, typically makes such connections manually. New connections are required to be made each time a new service is provided to a customer or an existing service is changed.

An example of such a system is described in U.S. Pat. No. 5,455,856 (Bell communications) that discloses device for providing temporary POTS telephone services to new customers until a permanent connection can be made. The device comprises two cross-connect matrices 58, 61 in series (as shown in FIG. 3 and as discussed in column 3, lines 39-49). Permanent connections are established between the terminals 51, 54 of the switches 58, 61 (or 78, 81) by means of jumpers 88 shown in FIG. 4 for established users. When it is required to provide a new user with telecommunication services, it is necessary to make a temporary connection that interconnects both cross-connects 58, 61 via a temporary bus 85. To achieve this, both cross-connects 58, 61 (or 78, 81) are operated remotely to establish a temporary link between new pairs of feeder cables and new pairs of distribution cables through the bus 85. Sometime later, when convenient, a service engineer visits the appropriate service box and hard wires the jumper connections 88 to replace the temporary bus link 85 with a permanent link 88. This arrangement does not allow for existing subscribers to be disconnected remotely and provided with a different telecommunication service remotely; it requires the engineer to visit the service box and physically remove the jumper connection 88.

The cost of making the connections has two main components. The first is the fixed cost of providing the equipment to make the connection. The second is the overhead cost associated with the requirement for the service engineer to visit the service box and make the connection. Service providers aim to minimise both of these costs.

Waiting can reduce the overhead cost until there are several connections to be made at the service box at the same time. This has the drawback that a customer may have to wait for the service to be connected. Alternatively service providers can minimise the overhead cost by including a cross-connect between the customer MDF and the provider-MDF that allows automated connects to be made from a remote location.

The known cross-connects used for such automated provisioning is either a cross bar switch or a Clos matrix network. Whereas a cross bar switch is non-blocking, a Clos network can be either blocking, non-blocking or non-blocking after reconfiguration.

One problem associated with the cross bar switch and the Clos network is the initial cost of purchase which increasing the fixed costs. This is particularly the case with a cross bar switch which becomes increasingly expensive as the number of cross bar switches increases due to the square relationship between the number of cross bar switches and the number of cross points. A further problem associated with the cross bar switch and the Clos network is the waste of resources due to the over provisioning of full non-blocking functionality. Typically about 5-10% of customer connections are changed per year, which means that 90-95% of connections remain unchanged. The provision of full non-blocking functionality therefore represents a waste of resources that increases the fixed costs for providing new services to customers.

What is required is a way of permitting a minimum number of connections to be made to provide different telecommunications services to users from a remote location so that costs can be minimised.

A further reference that we are aware of is WO 01/045452 (ADC Telecommunications) that relates to the field of providing telecommunication services and in particular to a way of remotely controlling a switching matrix to separate high and low frequency parts of a signal. There is no mention of using primary and secondary cross-connect for the provision of a plurality of different telecommunications services through selectively switchable temporary connections in the manner proposed by the present invention.

Another reference U.S. Pat. No. 6,349,093 (AT&T) also relates generally to the field of providing telecommunications services. In particular an increased efficiency is achieved using a permanent service communications channel to operate a switching matrix remotely. There is no mention of using primary and secondary cross-connect switches for the provision of a plurality of different telecommunications services via temporary connections.

EP 1,229,745 (NHC Communications) relates to the field of providing analogue telephone services when voice over IP services is interrupted due to power failure. FIG. 2 shows a remotely operated cross-connect for achieving this purpose. There is no mention of a primary and secondary cross-connect for the provision of a plurality of different telecommunications service via temporary connections.

An object of the present invention is to provide an apparatus for a telecommunications system that enables the service provider to be able, from a remote location, to disconnect a new or existing selected subscriber from first telecommunication services, and, if desired, connect the selected subscriber, at least temporarily, to a different telecommunication service from the provider.

According to a first aspect of the invention there is provided an apparatus for providing a plurality of different telecommunications services to a plurality of users (14, 16, 18, 20, 22) or a telecommunication network, the apparatus comprising a primary cross-connect (26) that has a plurality of subscriber lines (15, 17, 19, 21, 23) for supplying a selected telecommunications service from a provider of such services to a one or more of the subscriber lines (15, 17, 19, 21, 23), characterised in that the primary cross-connect (26) is associated with a plurality of remotely operable switches (34) each of which effectively connects a telecommunications service from the provider to a respective subscriber line (15, 17, 19, 21, 23), and a secondary cross-connect (28) that is in communication with the node (12) and the primary cross-connect (26), wherein the secondary cross-connect (28) and each of the switches (34) are selectively operable from a remote location (36) thereby to disconnect a selected one or more of the users (14, 16, 18, 20, 22) from an existing telecommunication service that is provided to the selected user via the respective switches 34 and the primary cross-connect (26).

Preferably the primary cross-connect (26), the secondary cross-connect (28), and each of the switches (34), are selectively operable from a remote location (36) thereby to connect one or more selected users to a predetermined alternative telecommunication service that is provided to the selected user via the secondary cross-connect (28).

Using two cross-connects in the manner proposed, avoids the requirement for provision of a full non-blocking functionality in a single cross-connect, thus reduces the initial purchase cost, and thereby keeps fixed costs to a minimum. Operation of the switches and the secondary cross-connect from a remote location further minimises the overhead costs by reducing the requirement for a service engineer to make connections. Such a network provides sufficient non-blocking functionality to make a given percentage of connections with a given blocking probability. The connections that cannot be made remotely, require a service engineer for manual connection. Permitting a limited number of connections to be made from a remote location, allows for major rewiring to be scheduled in a more efficient manner. The limited number of connections that can be made from a remote location before rewiring is required is an efficient way of managing the fixed and overhead costs.

Preferably a provider main distribution frame (also called a provider-MDF) is provided between a node of the telecommunications network and each of the primary cross-connect, and the secondary cross-connect.

A customer main distribution frame (also called customer-MDF (not shown) may be provided downstream of the primary cross-connect.

A test head (30) for determining operability of network connections may be provided, in which case, the test head is preferably connected to the secondary cross-connect.

Preferably the primary cross-connect and the secondary cross-connect are located in a service box. The test head could also be located in the service box.

According to a further aspect of the present invention there is provided a method of operating an apparatus for providing a plurality of different telecommunications services to a plurality of users (14, 16, 18, 20, 22) of a telecommunications network, that has a primary cross-connect (26) having a plurality of subscriber lines (15, 17, 19, 21, 23) for supplying a selected telecommunications service from a provider of such services to a one or more of the subscriber lines (15, 17, 19, 21, 23), a primary cross connect switch (26) with a plurality of subscriber lines (15, 17, 19, 21, 23) for supplying a selected telecommunications service to a selected user (14, 16, 18, 20, 22); and a secondary cross-connect (28) in communication with the node (12) and the primary cross-connect (26); the method being characterised by the step of providing each user line (29(a), 29(b), 29(c), 29(d), 29(e)) with remotely operable associated respective switch (34) and the step of operating a respective switch (34) from a remote location to disconnect an existing telecommunications service supplied to the selected user (14, 16, 18, 20, 22).

Preferably the method also includes the step of operating the primary cross-connect (26), the secondary cross-connect (28), and a respective switch (34), from a remote location, thereby to connect a different telecommunications service from the provider to the selected user (14, 16, 18, 20, 22).

The method may include the step of manually rewiring the primary cross-connect (26) and the secondary cross-connect (28) in the event that the secondary cross-connect (28) becomes blocked.

The method may include the steps of; providing a test head (30); and determining operability of network connections using the test head (30).

Preferably the primary cross-connect and the secondary cross-connect are located in a service box. Optionally the test head is located in the service box.

According to a further aspect of the present invention there is provided a method of operating a telecommunications network comprising the steps of; providing a node for supplying a plurality of different telecommunications services to a plurality of users; providing a primary cross-connect in communication with the node; and, providing the primary cross-connect with a plurality of subscriber lines for supplying a selected telecommunications service to a selected user; characterised in that the method further includes the step of;
(a) providing a secondary cross-connect in communication with the node and the primary cross-connect;
(b) providing each subscriber line with an associated respective switch;
(c) operating a respective switch to disconnect an existing telecommunications service to the selected user; and
(d) operating the primary cross-connect and the secondary cross-connect to supply the selected telecommunications service to the selected user via the secondary cross-connect, wherein the respective switch, the primary cross-connect and the secondary cross-connect are adapted for operation from a remote location.

The method of operating a telecommunications network may further include the step of rewiring the primary cross-connect and the secondary cross-connect on blocking of the secondary cross-connect. This step is required when no more connections can be made from the remote location.

Preferably the method of operating a communications network further includes the step of; providing a test head; and determining operability of network connections using the test head.

According to a further aspect of the present invention there is provided a telecommunications network including one or more nodes for providing a plurality of different telecommunication services to a plurality of users, said network incorporating one or more apparatuses constructed in accordance with the present invention.

The present invention will now be described, by way of example, with reference to the accompanying drawings, in which: —

FIG. 1 is a schematic diagram of a telecommunications network constructed in accordance with the present invention.

Referring to FIG. 1 there is shown a schematic diagram of a telecommunications network 10 according to the present invention. For the purposes of clarity, only arrows illustrating the flow of data in the downstream direction are shown. The network 10 includes a Multi-Service Access Node (MSAN) 12 that can provide different telecommunications services to a plurality or users. For simplicity, in the example shown there are five users 14, 16, 18, 20, and 22, but, as will be explained herein, usually there are an unlimited number of users.

In the upstream direction, the MSAN 12 is in communication with a wider telecommunications network 13, and to a remote location shown schematically by the reference numeral 36.

In the downstream direction, the MSAN 12 is in communication with a provider Main Distribution Frame, (Also called provider-MDF 24). In turn, the provider-MDF 24 is in communication with a primary cross-connect 26, and a secondary cross-connect 28 in the downstream direction. In the example shown in FIG. 1 the secondary cross-connect 28 is in communication with the primary cross-connect 26 via a bundle 27 of three lines 27(a), 27(b), 27(c).

A bundle 29 of five user lines 29(*a*), 29(*b*), 29(*c*), 29(*d*), and 29(*e*) connects the provider-MDF 24 and the primary cross-connect 26. In the downstream direction, the primary cross-connect 26 is in communication with the users 14, 16, 18, 20, and 22, to supply telecommunications services via respective subscriber lines 15, 17, 19, 21, and 23.

Also shown is a test head 30 that is in communication with the secondary cross-connect 28. The provider-MDF 24, the primary cross-connect 26, the secondary cross-connect 28, and the test head 30 are all located in a service box 32 that is located near to the end user 14, 16, 18, 20, or 22.

FIG. 1 also shows a series of five two-position (open or closed) switches 34 associated with the primary cross-connect 26. Each switch 34 is associated with a respective subscriber line 15, 17, 19, 21, 23, and enables a particular service which is provided to a user 14, 16, 18, 20, 22 to be selectively connected or disconnected manually or remotely as will be explained herein.

In the example of FIG. 1, the switches 34 associated with the subscriber lines 17, 19, 23 are shown closed so that a telecommunications service is supplied directly from the provider-MDF 24. In this manner, the users 16, 18, 22 are supplied for example with Plain Old Telephone Services (POTS) via the respective user lines 29(*a*) to 29(*e*) and subscriber lines 15, 17, 19, 21, and 23.

In FIG. 1, the switches 34 associated with subscriber lines 15 and 21 have been opened remotely so that the users 14 and 20 are disconnected from the provider-MDF 42 via the user lines 29(*a*), and 29(*d*), and the secondary cross-connect 28 remotely to make the connections 35 between the user lines 27(*a*), 27(*b*) and the respective subscriber lines 15 and 21 in the primary cross-connect 26. In this way a different telecommunications service can then be supplied to the users 14, 20 from the provider of such services through the provider-MDF 24 and the secondary cross-connect 28 by operating In order to achieve cost efficiency, the secondary cross-connection switch 28 is designed to limit the number of possible connections to a very small number of users compared to the number of users. In the above example, the primary cross-connect 26 is a 5×3 cross bar switch, and the secondary cross-connect 28 is a 3×2 cross bar switch. Accordingly, the primary cross-connect 26 has five subscriber lines, and permits three of those to be changed, and the secondary cross-connect 28 can provide three new services to any of the five subscriber lines. It is to be understood that the secondary cross-connect 28 could be designed to provide new or alternative connections to more than three users, as will be explained later.

From FIG. 1 it will be seen that subscriber lines 15 and 21 have been changed to a different telecommunications service. A third change is possible if any one of the switches 34 associated with the subscriber lines 17, 19, 23, are opened, and the cross-connect 28 operated to make a connection between user line 27(*c*) and one of the lines 17, 19, or 23. However in this example, a fourth change will be blocked because the secondary cross-connect 28 only permits three connections to be made.

The test head 30 of the secondary cross-connect 28 can be connected to any of the five subscriber lines to test a subscriber line 15, 17, 19, 21, 23 and the connection to the subscriber 14, 16, 18, 20, 22. Such a test head 30 can determine whether there are any inoperative lines. If the three connections of the secondary cross-connect 28 are already occupied, one of these is temporarily taken out of service so that there is a free line to permit the test head 30 to be connected to the primary cross-connect 26.

Once a service engineer has installed the apparatus of FIG. 1 within the service box 32, and set the switches 34 manually, the secondary cross-connect 28 and switches 34 can be operated from a remote location 36 such as, the telephone company premises. The remote location 36 communicates with the components in the service box 32 via the wider telecommunications network 13.

When a user 14, 16, 18, 20, or 22, or the provider, requires a service change, the appropriate switch 34 associated with that user's subscriber line 15, 17, 19, 21, 23, is opened from the remote location 36 and thereby disconnects the current telecommunications service from the provider-MDF 24.

If desired, a new service or an alternative service can then be supplied to the disconnected user 14, 16, 18, 20, 22, via the secondary cross-connect 28, by making the appropriate a connection 35 in the primary cross-connect 26 from the remote location 36. The new service is then provided via the secondary cross-connect 28 and the appropriate connections 35 in the primary cross connect switch 26.

Periodically it is necessary for a service engineer to visit the service box 32 to rewire the primary cross-connect 26, the secondary cross-connect 28, and the provider-MDF 24, manually, when no more connections can be made via the secondary cross-connect 28. Rewiring would of course require removing the temporary connections 35 provided by the secondary cross-connect 28, and resetting the appropriate switches 34 of the associated subscriber lines (15, 17, 19, 21, 23. The telecommunications service can then be provided via the primary cross-connect 26 and one of the user lines 29(*a*) to 29(*e*), or via a second bundle (not shown) of user lines 29(*a*) to 29(*e*) that is laid in parallel to the first bundle of lines 29(*a*) to 29(*e*). The rewiring releases the secondary cross-connect 28 to resume its function of providing an alternative connection path for changing the supply of services to one or more of the five subscribers.

It will be appreciated that whilst only five users 14, 16, 18, 20, 22 of the network 10 are shown, the present invention is scalable to provide many more subscriber lines.

Typically, the primary cross-connect 26 is a rack mounted card that has a 24×7 cross bar switch. Such a cross bar switch has twenty four subscriber lines per card with the possibility of changing the telecommunications service to seven of those lines, whilst an eighth change would be blocked. It is envisaged that there could be as many as fourteen such cards in one rack to provide three hundred and thirty six subscriber lines. In this latter mentioned example, the secondary cross-connect 28 would be for example, a 100×50 cross bar switch which has the potential to swap seven out of twenty four lines on any of the fourteen cards.

Alternatively, a plurality of secondary cross-connects 28 could be provided. Such an arrangement could be expanded to include further cards during routine visits to the service box 32 to provide additional non-blocking capacity if necessary.

The provision of services in accordance with the present invention from a remote location 36 minimises the overhead costs and the requirement for a service engineer to visit the service box 32. Permitting a limited number of connections to be made from a remote location, allows for major re-wiring to be scheduled in a more efficient manner. The arrangement according to the present invention provides sufficient non-blocking functionality and minimises the fixed costs by avoidance of over-provision of non-blocking functionality. The limited number of connections that can be made from a remote location before rewiring is required is an efficient way of managing fixed and overhead costs.

The invention claimed is:

1. An apparatus for providing a plurality of different telecommunications services from a provider to a plurality of users of a telecommunication network, the apparatus comprising:
   a primary cross-connect connected between a node of the provider and the plurality of subscriber lines, and operative to supply a selected telecommunications service from the provider node to one or more of the subscriber lines;
   a plurality of remotely operable switches associated with the primary cross-connect, each switch operative to connect a telecommunications service from the provider to a respective subscriber line via the primary cross-connect; and
   a secondary cross-connect in communication with the provider node and the primary cross-connect, such that the secondary cross-connect can be connected to at least one of the subscriber lines by making an appropriate connection in the primary cross-connect, the secondary cross-connect and each switch selectively operative from a remote location to disconnect a selected one or more of the users from an existing telecommunication service that is provided to the selected user via the respective switches and the primary cross-connect.

2. The apparatus of claim 1 wherein the primary cross-connect, the secondary cross-connect, and each of the switches are selectively operable from a remote location to connect one or more selected users to a predetermined alternative telecommunication service that is provided to the selected user via the secondary cross-connect.

3. The apparatus of claim 1 further comprising a provider main distribution frame (provider-MDF) between a node of the telecommunications network and each of the primary cross-connect and the secondary cross-connect.

4. The apparatus of claim 3 further comprising a customer main distribution frame (customer-MDF) downstream of the primary cross-connect.

5. The apparatus of claim 1 further comprising a test head for determining operability of network connections.

6. The apparatus of claim 5 wherein the test head is connected to the secondary cross-connect.

7. The apparatus of claim 1 wherein the primary cross-connect and the secondary cross-connect are located in a service box.

8. The apparatus of claim 1 wherein the apparatus is connected to a telecommunications network including one or more nodes for providing a plurality of different telecommunication services to a plurality of users.

9. A method of operating an apparatus for providing a plurality of different telecommunications services to a plurality of users of a telecommunications network, the apparatus comprising a primary cross-connect having a plurality of subscriber lines for supplying a selected telecommunications service from a node of a provider of such services to one or more of the subscriber lines, a primary cross connect switch with a plurality of subscriber lines for supplying a selected telecommunications service to a selected user via the primary cross-connect, and a secondary cross-connect in communication with the node and the primary cross-connect, such that the secondary cross-connect can be connected to at least one of the subscriber lines by making an appropriate connection in the primary cross-connect, the method comprising:
   providing a remotely operable switch in each subscriber line; and
   operating a respective switch from a remote location to disconnect an existing telecommunications service supplied to the selected user.

10. The method of claim 9 further comprising operating the primary cross-connect, the secondary cross-connect, and the respective switch from a remote location, to thereby connect a different telecommunications service from the provider to the selected user.

11. The method of claim 10 further comprising manually rewiring the primary cross-connect and the secondary cross-connect in the event of the secondary cross-connect becoming blocked.

12. The method of claim 9 further comprising:
   providing a test head; and
   determining operability of network connections using the test head.

13. A method of operating a telecommunications network, comprising:
   providing a node for supplying a plurality of different telecommunications services to a plurality of users;
   providing a primary cross-connect in communication with the node;
   providing the primary cross-connect with a plurality of subscriber lines for supplying a selected telecommunications service to a selected user;
   providing a secondary cross-connect in communication with the node and the primary cross-connect;
   providing each subscriber line with an associated remotely operable switch;
   operating a respective switch from a remote location to disconnect an existing telecommunications service to the selected user; and
   operating the primary cross-connect and the secondary cross-connect from a remote location thereby to supply the selected telecommunications service to the selected user via the secondary cross-connect and appropriate connections in the primary cross-connect.

* * * * *